(12) United States Patent
Nelson

(10) Patent No.: US 7,167,731 B2
(45) Date of Patent: *Jan. 23, 2007

(54) EMOTICON INPUT METHOD AND APPARATUS

(75) Inventor: Jonathan O. Nelson, Kirkland, WA (US)

(73) Assignee: Wildseed Ltd., Seatle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/224,679

(22) Filed: Sep. 12, 2005

(65) Prior Publication Data

US 2006/0079293 A1 Apr. 13, 2006

Related U.S. Application Data

(63) Continuation of application No. 09/932,592, filed on Aug. 17, 2001, now Pat. No. 6,987,991.

(51) Int. Cl.
H04B 1/38 (2006.01)

(52) U.S. Cl. ............. 455/566; 455/418; 340/7.56

(58) Field of Classification Search ............. 455/566, 455/550.1, 575.1, 418; 340/7.39, 7.51, 7.55, 340/7.56
See application file for complete search history.

(56) References Cited

U.S. PATENT DOCUMENTS

| | | | |
|---|---|---|---|
| 6,021,313 A | 2/2000 | Koga | |
| 6,539,240 B1 * | 3/2003 | Watanabe | 455/566 |
| 6,987,991 B1 * | 1/2006 | Nelson | 455/566 |
| 2002/0077135 A1 * | 6/2002 | Hyon | 455/466 |
| 2002/0156866 A1 * | 10/2002 | Schneider | 709/218 |
| 2003/0107555 A1 * | 6/2003 | Williams | 345/169 |

FOREIGN PATENT DOCUMENTS

| | | | |
|---|---|---|---|
| GB | 2376379 | * | 12/2002 |
| JP | 10-191417 A | | 7/1998 |
| JP | 2002 2044285 A | | 2/2002 |

* cited by examiner

Primary Examiner—Lee Nguyen
(74) Attorney, Agent, or Firm—Schwabe, Williamson & Wyatt, P.C.

(57) ABSTRACT

An apparatus, such as a communication device, is provided with emoticon input logic associated with an input key to improve the ease-of-use of the apparatus for entering emoticons, e.g. into a text message, while the apparatus is operating e.g. in a text mode. Responsive to a selection of the associated input key, one or more emoticons are displayed for selection. A user may "scroll" through the one or more displayed emoticons to "select" an emoticon. In one embodiment, current focus is place on one of the displayed emoticons, and the emoticon with the current focus is automatically selected upon elapse of a predetermined amount of time after the current focus was placed.

25 Claims, 10 Drawing Sheets

EMOTICON INPUT METHOD AND APPARATUS

CROSS-REFERENCE TO RELATED APPLICATION

This application is a continuation of prior application Ser. No. 09/932,592, filed Aug. 17, 2001 now U.S. Pat. No. 6,987,991, having the same title and inventorship.

FIELD OF THE INVENTION

The present invention relates to the field of textual or nonverbal communication. More specifically, the present invention relates to methods and apparatuses associated with the employment of emoticons in textual or non-verbal communications, such as email or instant messaging, practiced on e.g. mobile communication devices, as in the case of wireless mobile telephones.

BACKGROUND

Advances in integrated circuit, microprocessor, networking and telecommunication technologies have led to the development and wide spread adoption of networked computing devices and mobile communication devices. As a result, email, instant messaging, and wireless telephone calls have all become important vehicles of communication for a large segment of the population, if not the preferred forms of communication for these users.

It is known that for many users, their email and instant messaging communications (also referred to as textual or non-verbal communications) often involve the use of emoticons, such as the "smiling face" or the "sad face". However, few email or instant messaging applications offer any assistance to a user to enter and use emoticons in their communications. Some instant messaging applications offer the minimal assistance of converting or replacing a handful of widely used emoticon forming sequences of characters to corresponding graphical symbols. For example, when the characters ":" (colon), "=" (equal sign) and ")" (right parenthesis) are successfully entered, some instant messaging applications automatically replace the entered characters with the graphical symbol " ".

These prior art facilities suffer from a number of disadvantages. First, typically only a handful of these emoticon forming character sequences are supported. Thus, virtually no assistance is provided to a user who chooses to be creative, and uses an unconventional sequence of characters to form an emoticon, e.g. the character sequence of ":", "#" and "0" for a flabbergasted or astounded expression. Further, regardless of whether the character sequence is conventional or unconventional, a user typically has to enter the emoticon forming characters one at a time. This disadvantage is amplified in situations where the user is conducting the textual or non-verbal communication using a communication device having limited input facilities, such as wireless mobile phones.

Accordingly, facilities that are more user friendly in assisting a user to employ emoticons in their communications, especially on communication devices with limited input facilities, such as wireless mobile phones, are desired.

BRIEF DESCRIPTION OF THE DRAWINGS

The invention is illustrated by way of example and not by way of limitation in the figures of the accompanying drawings in which like references indicate similar elements, and in which.

DETAILED DESCRIPTION

The present invention includes the provision of emoticon input logic to enhance the usability of a communication device. For ease of understanding, the present invention will be primarily described in the context of wireless mobile phones. However, the present invention is not so limited. The present invention may also be practiced on other communication devices besides wireless mobile phones.

In the description to follow, various aspects of the present invention will be described. For purposes of explanation, specific numbers, materials and configurations are set forth in order to provide a thorough understanding of the present invention. However, in selected instances, well-known features are omitted or simplified in order not to obscure the present invention. The present invention may be practiced with only some of the aspects described, and without some of the specific details enumerated.

Various options will be described as multiple discrete steps in turn, in a manner that is most helpful in understanding the present invention. However, the order of description should not be construed as to imply that these operations are necessarily order dependent. In particular, these operations need not be performed in the order of presentation.

Parts of the description will be presented in terms of operations performed by a processor based device, using terms such as displaying, focusing, selecting, and the like, consistent with the manner commonly employed by those skilled in the art to convey the substance of their work to others skilled in the art. As well understood by those skilled in the art, the quantities take the form of electrical, magnetic, or optical signals capable of being stored, transferred, combined, and otherwise manipulated through mechanical, electrical and optical components of the processor based device.

The term processor as us in this specification includes microprocessors, microcontrollers, digital signal processors, and the like, that are standalone, adjunct or embedded.

The description repeatedly uses the phrase "in one embodiment". Ordinarily the phrase does not refer to the same embodiment, although it may. The terms "comprising", "including", and "having" are frequently used in the specification and in the claims; the terms are synonymous.

OVERVIEW

Figure 1:
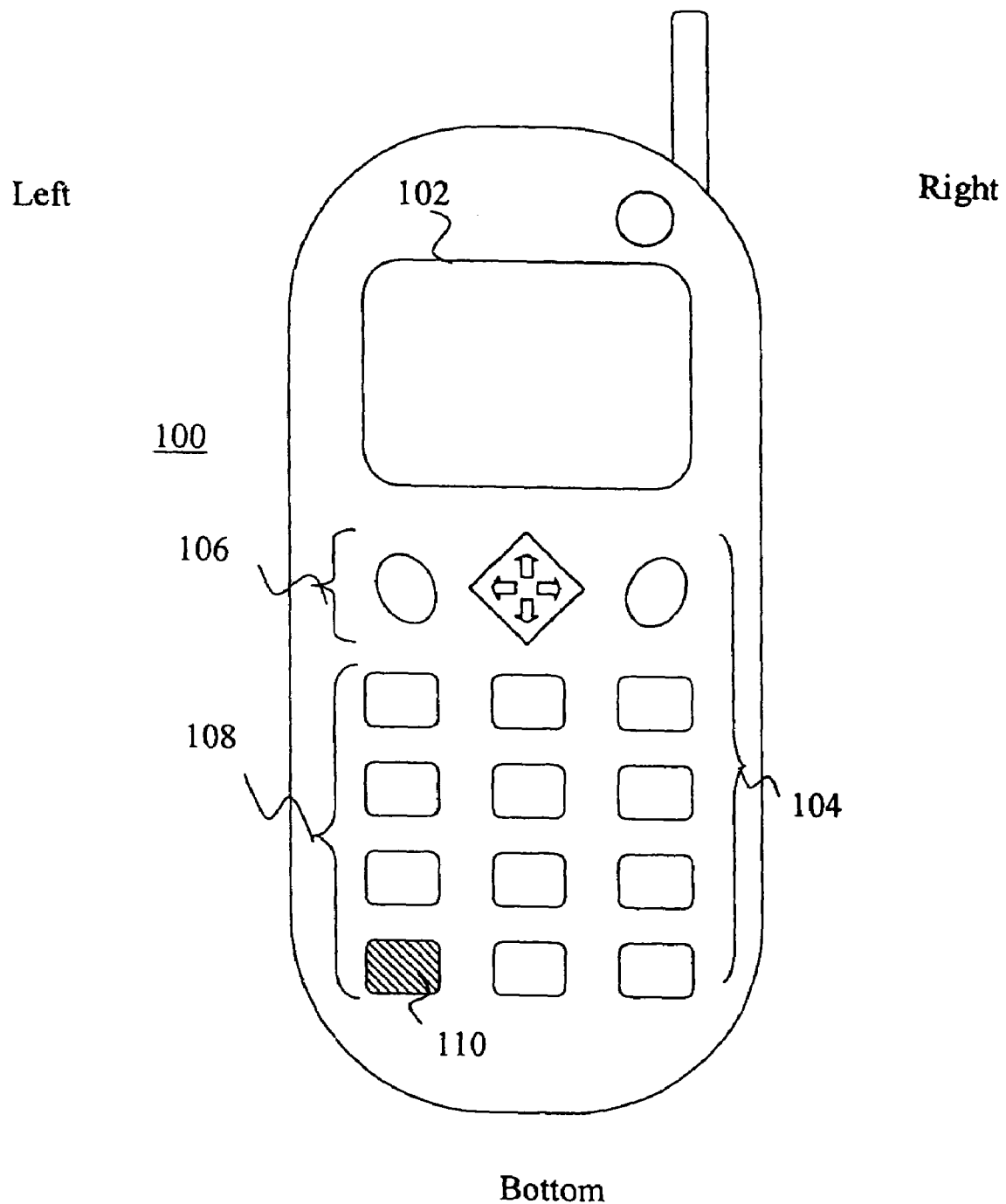
FIG. 1 illustrates a wireless mobile phone incorporated with the teachings of the present invention for assisting a user in inputting an emoticon, in accordance with one embodiment.

Referring now to FIG. 1, wherein a wireless mobile phone 100 incorporated with the teachings of the present invention, in accordance with one embodiment, is shown. As illustrated, for the embodiment, wireless mobile phone 100 comprises display 102 and input keys 104, including in particular, input key 10. Wireless mobile phone 100 operates in at least two modes, a voice or verbal mode, and a text or non-verbal mode. Further, wireless mobile phone 100 is endowed with emoticon input logic (not shown) to facilitate a user in inputting emoticons, e.g. for a text message during the text or non-verbal mode of operation. For the embodiment, the emoticon input logic is associated with input key 110. That is, the emoticon input logic is activated by input key 10, e.g. while wireless mobile phone 100 operates in the text mode. As will be described in more detail below, using input key 110, supported by the emoticon input logic, a user may enter an emoticon e.g. into a text message in a more user friendly manner.

Display 102 is provided to facilitate display of data, such as a textual message received or being composed, status information, such as "calling . . . " or "low battery", choice of applications, such as "calendar" or "phone book", choice of options, such as "AM" or "PM" (when setting a system clock), and so forth. The term "text" and its related forms, such as "textual", as used in the present application, are synonymous with the term "non verbal". In other words, a "textual" message may comprise of characters from a standard character set as well as "special" characters, symbols, glyphs, icons and the like.

Input keys 104 are provided to facilitate input of data, command, user responses and/or selections to phone 100. For the embodiment, input keys 104 include control keys 106 and alphanumeric keys 108; and as described earlier, the emoticon input logic is associated with input key 110 of alphanumeric keys 108. Control keys 106 may include "make call" or "end call" function keys, as well as "scrolling" keys to facilitate a user in directing scrolling direction, i.e. up, down, to the right or to the left, when scrolling through an enumerated list of options or choices. Alphanumeric keys 108, for the embodiment, has a total of 12 alphanumeric keys, arranged in a 4×3 array configuration, that is 4 rows and 3 columns, with input key 110 (associated with the emoticon input logic) disposed at the $4^{th}$ row and $1^{st}$ column position (with the row and column positions determined from top to bottom, and left to right respectively). Alphanumeric keys 108 are provided to facilitate input of alphanumeric data, including in particular, the input of emoticons through input key 110 (while phone 100 operates in the text mode).

OPERATIONS

Figure 2:
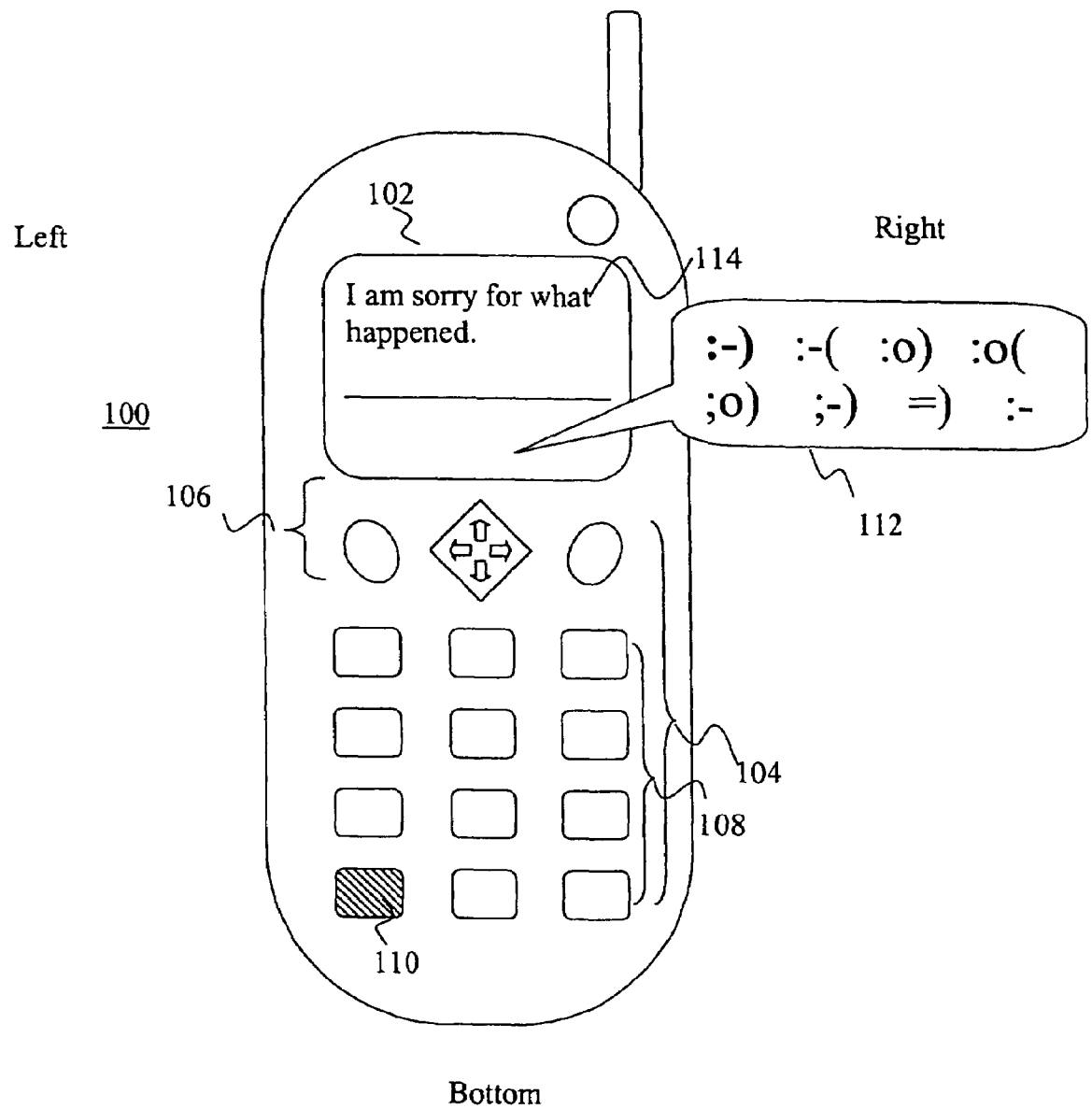
FIG. 2 illustrates a state of the wireless mobile phone of FIG. 1, where a list of emoticons is displayed for user selection, responsive to an initial selection of an input key.
Figure 3:
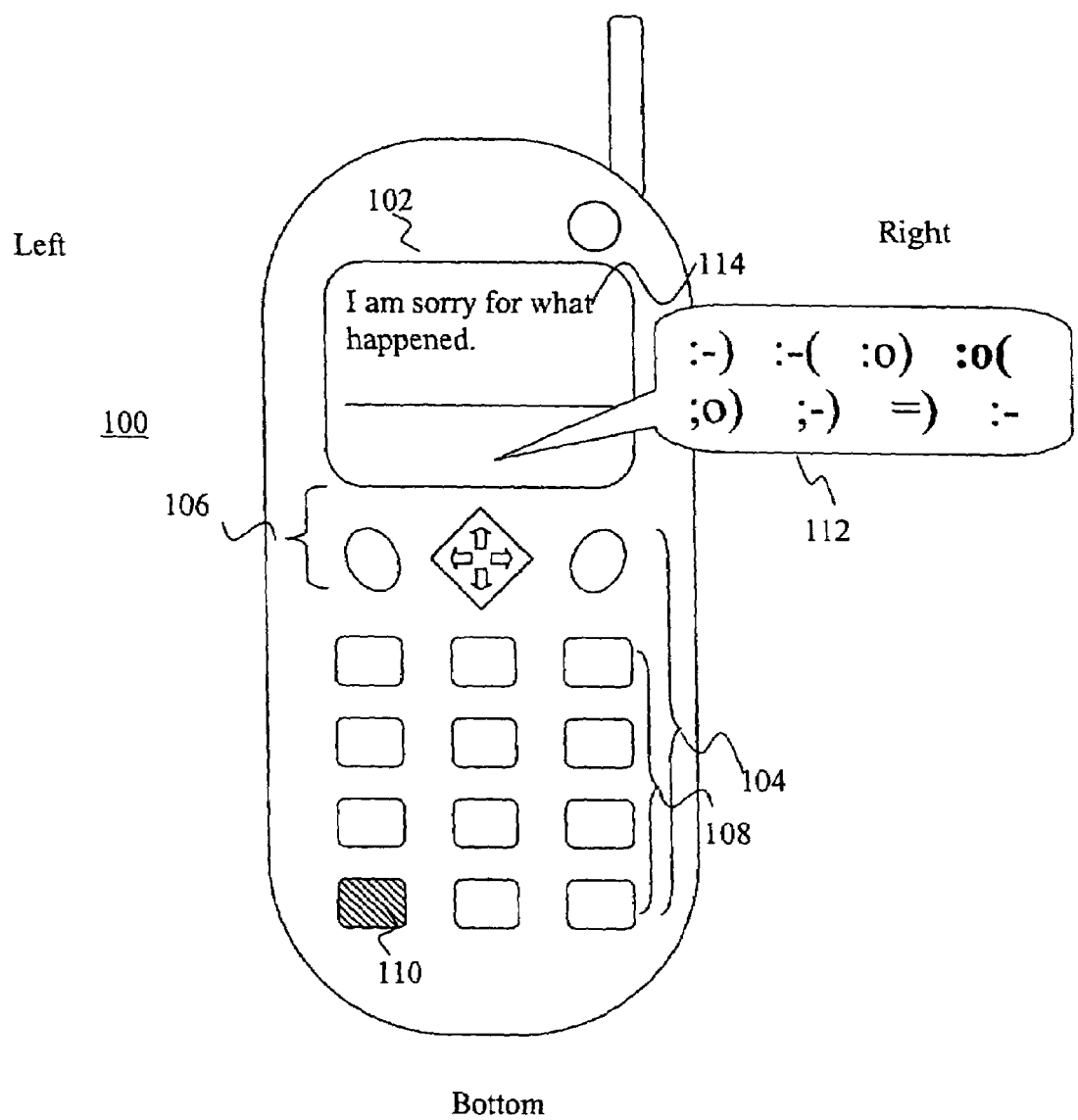
FIG. 3 illustrates another state of the wireless mobile phone of FIG. 1, with the current focus being placed on one of the displayed emoticons, as directed by the user traversal actions on the displayed list.
Figure 4:
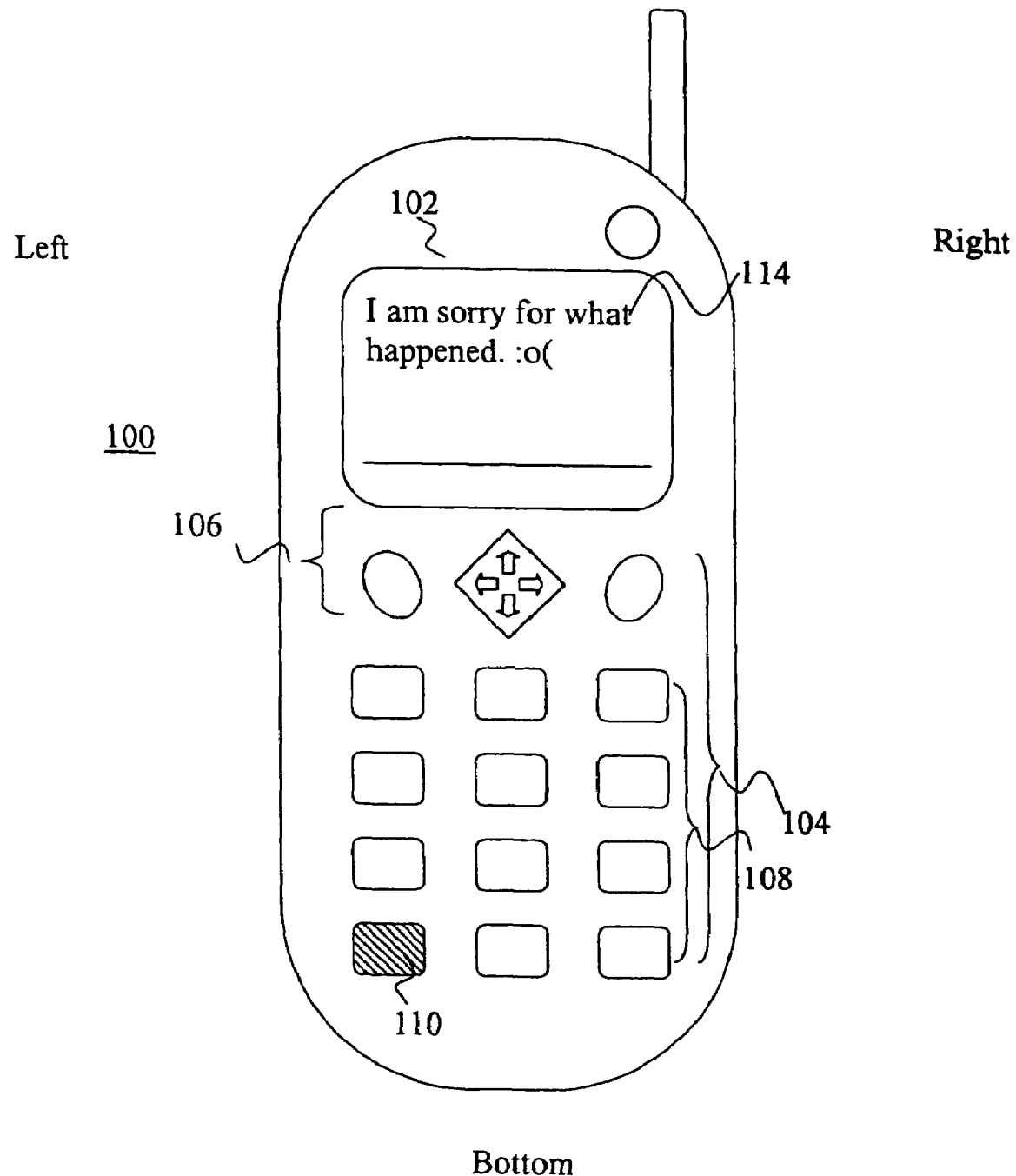
FIG. 4 illustrates yet another state of the wireless mobile phone of FIG. 1, with a selected emoticon incorporated as part of a textual message being composed.

FIGS. 2–4 illustrate a contemplated usage of input key 110 and the associated emoticon input logic (while phone 100 operates in the text mode). More specifically, FIGS. 2–4 illustrate the external visible states of wireless mobile phone 100 under the contemplated usage. As illustrated in FIG. 2, in response to an initial selection of input key 110 (while phone 100 is operating in the text mode, e.g. when a textual message is being composed), a list of emoticons 112 is displayed on display 102 for user selection. More specifically, for the illustrated embodiment, a list of emoticon forming character sequences is displayed on display 102 for user selection. For example, the "smiling face" emoticon is displayed by displaying the three character sequence comprising the ":" (colon), the "-" (hyphen) and ")" (right parenthesis) character. In alternate embodiments, singular graphic symbols, such as ☺, may be employed instead.

For the illustrated embodiment, emoticon forming character sequences 112 (hereinafter simply emoticons) are displayed in a left-to-right, then top-to-bottom arrangement. In alternate embodiments, e.g. in support of other languages, such as Hebrew, Chinese and so forth, emoticons may be displayed in a right-to-left, then top-to-bottom arrangement, a top-to-bottom then left-to-right arrangement, or a top-to-bottom then right-to-left arrangement.

For the illustrated embodiment, one of displayed emoticons 112 is also the "current focus" emoticon. Initially, under the left-to-right then top-to-bottom display arrangement, the leftmost emoticon among the emoticons displayed in the top row is given the "current focus". In one embodiment, placing the "current focus" on an emoticon formed with a sequence of characters comprises highlighting all the characters. The term "highlighting" as used in the present application, including the claims, includes all known techniques to cause a sequence of characters to be visually distinct from other neighboring sequences of character, to draw a user's attention to the "highlighted" sequence of characters. These known techniques include but are not limited to underlying, italicizing or employing bold faces for the sequence of characters.

As illustrated in FIG. 3, by selecting input key 110 again in a timely manner (thereby preventing an associated timer to expire), a user may scroll through the displayed list of emoticons 112. The emoticon having the "current focus" is updated correspondingly as the user scrolls through the list. In alternate embodiments, other approaches, such as using one or more of control keys 106, may be practiced to facilitate scrolling through the displayed list of emoticons. In one embodiment, scrolling through emoticons formed with character sequences comprises scrolling through the character sequences, i.e. moving from one character sequence to another character sequence.

As illustrated in FIG. 4, for the embodiment, upon elapse of a predetermined amount of time after the last selection of input key 110 (allowing the earlier mentioned associated timer to expire), the emoticon of the "current focus" is selected, and inserted into e.g. text message 114 being composed. In alternate embodiments, selection of the "current focus" emoticon may be made in other manners, e.g. by "double clicking" input key 110 (i.e. successively clicking input key 110 at a predetermined "rapid" rate) or by selecting other input keys. Further, in alternate usages, it is contemplated that the selected emoticon may be used in a standalone manner instead, e.g. transmitted to a recipient directly (without having incorporated a textual message). In one embodiment, selecting emoticon (formed with a sequence of characters) with the "current focus" comprises selecting all the characters of the emoticon with the "current focus".

Note that upon selection, the characters of an emoticon forming character sequence (whether the sequence is being used in a standalone manner or as part of a text message) may be individually edited. For example, upon selection of the three character sequence ":", "-" and ")", one or more of the three characters ":", "-" and ")" may be individually edited, allowing a user to modify an emoticon to his/her liking. The "-" character may be modified to "#", or the ")" character may be modified to "0", and so forth.

SOFTWARE AND HARDWARE

Figure 5:
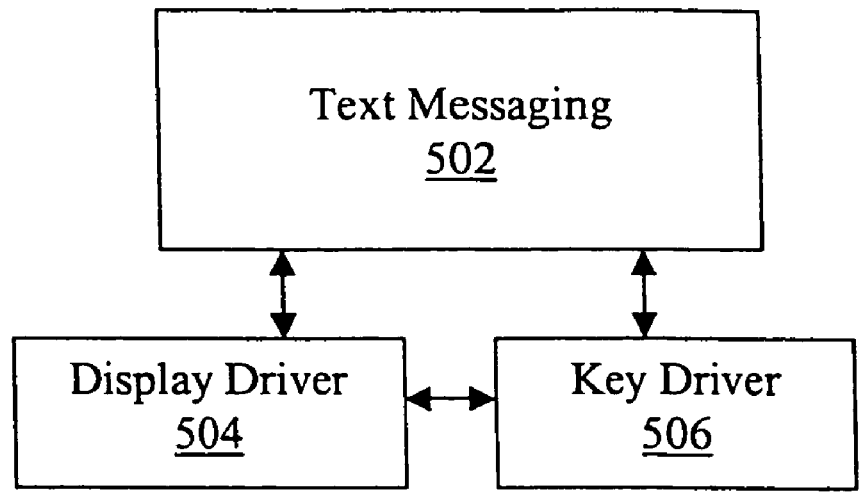
FIG. 5 illustrates the relevant software elements of the wireless mobile phone of FIG. 1, for practicing the present invention, in accordance with one embodiment.
Figure 6:
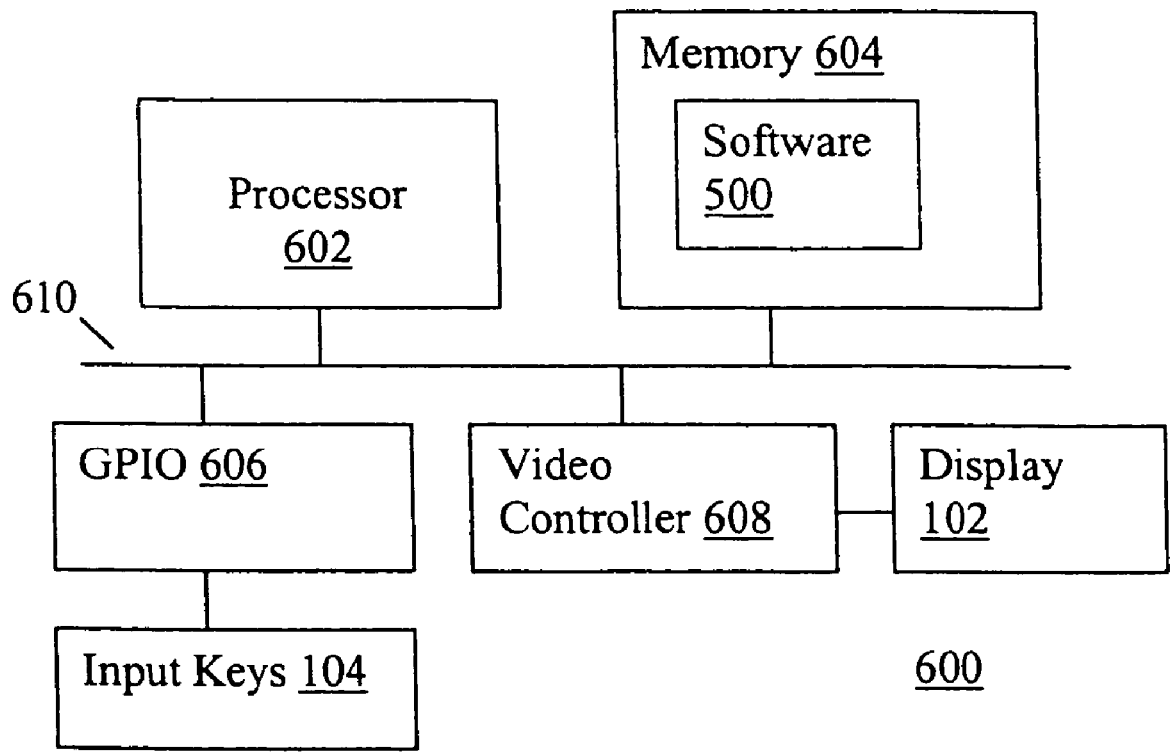
FIG. 6 illustrates the relevant hardware elements of the wireless mobile phone of FIG. 1, for practicing the present invention, in accordance with one embodiment.

FIGS. 5–6 illustrate a software and a hardware component view of the relevant elements of wireless mobile phone 100, in accordance with one embodiment. As illustrated in FIG. 5, the relevant software elements 500 of phone 100 includes textual communication component 502 provided to facilitate textual communication, display driver 504 provided to facilitate rendering of display onto display 102, and input driver 506 provided to support usage of input keys 104. Input driver 506 is incorporated with the earlier described emoticon input logic to support the earlier described emoticon input process. As illustrated, input driver 506 provides textual communication component 502 with the inputs received through input keys 104 (when textual communication component 502 is the "current" component having given control to receive the services of key driver 506). In the case of input key 110, while phone 100 is operating in the text mode, input driver 506 provides textual communication component 502 with the specific "selected" emoticon, after having assisted the user in selecting one of the available emoticons.

FIG. 6 illustrates the relevant hardware components of wireless mobile phone 100 for practicing the present invention, in accordance with one embodiment. As illustrated, the relevant hardware components 600 include storage medium 604 and processor 602. For the embodiment, the relevant hardware components 600 also include general purpose input/output (GPIO) interface 606 and video controller 608. The elements are coupled to each other via bus 610.

Storage medium 604 is provided to store the programming instructions implementing key driver 506. In one embodiment, storage medium 604 is a type of non-volatile memory, which is also employed to store the programming instructions implementing display driver 504 and textual communication component 502. Processor 602 coupled to storage medium 604 is provided to execute the programming instructions implementing key driver 506. In one embodiment, processor 602 is also employed to execute the programming instructions implementing display driver 504 and textual communication component 502. GPIO 606 and video controller 608 are provided for coupling input keys 104 and display 102 respectively.

Figure 7:
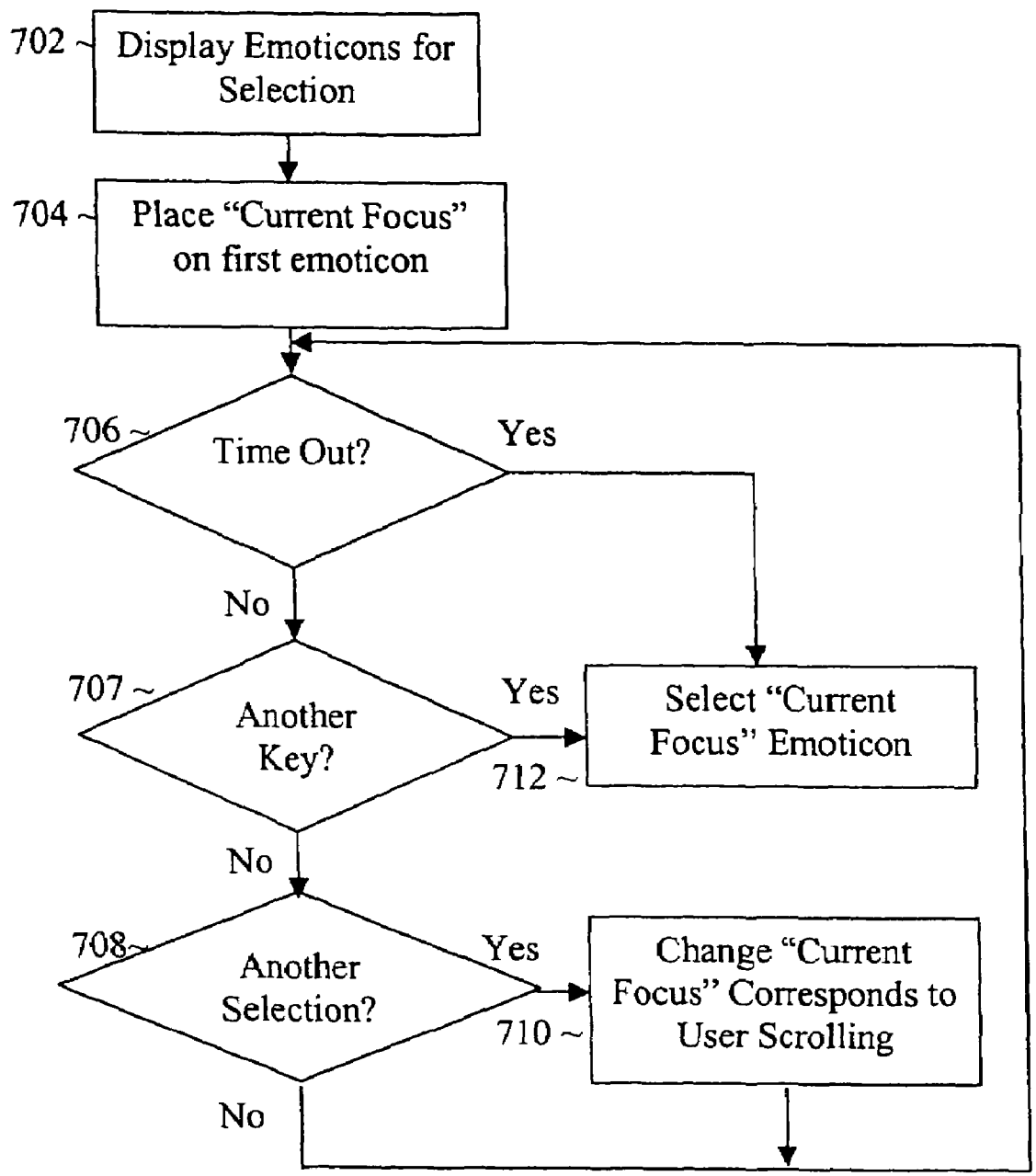
FIG. 7 illustrates the operational flow of the relevant aspect of the emoticon input support logic provided in the key driver of FIG. 5, in accordance with one embodiment.

FIG. 7 illustrates the operational flow of the relevant aspects of key driver 506 in support of the earlier described emoticon input process. As illustrated, upon detecting the selection of key 110 while pone 100 is operating in the text mode, key driver 506 causes a list of emoticons 112 to be displayed for user selection, block 702. Upon displaying the list of emoticons 112, key driver 506 further places a "current focus" on the "first" emoticon displayed, block 704.

Thereafter, key driver 506 determines if a predetermined associated timer has expired, block 706. If the associated timer has not expired, key driver 506 determines if another input key has been selected, block 707. If another input key has not been selected, key driver 506 determines if input key 110 is selected again, block 708. The determination blocks 706–708 are repeated continuously, until eventually either input key 110 is re-selected before another input key is selected or the associated timer expires, or another input key is selected, or the associated timer expires.

If input key 110 is re-selected before another input key is selected or the associated timer expires, key driver 506 interprets the user action as a scrolling action, and updates the "current focus" to reflect the user's scrolling action correspondingly, block 710. Further, key driver 506 resets the associated timer. For the embodiment, scrolling beyond the end of the list causes the "current focus" to be placed back on the first emoticon. In other words, the user may scroll through the emoticons in a round-robin fashion, and return to selected a "passed" emoticon. In alternate embodiments, where control keys 106 are employed to facilitate scrolling, naturally, scrolling in either forward or backward direction may also be supported.

Eventually, either the user selects another input key, or after the user stops selecting input key 110 for the predetermined time period, the associated timer expires. At such time, key driver 506 sets the emoticon having the "current focus" as the selected emoticon, and notifies textual communication 502 accordingly (which in the earlier described contemplated usage results in the selected emoticon being incorporated as part of the textual message being composed), block 712.

As described earlier, the emoticons may be character sequences of multiple characters or single pixel-map based graphical symbols. For emoticons implemented through character sequences, the individual characters of the selected character sequence become individually editable upon incorporation into a textual message. A single pixel-map based graphical symbol, upon selection, may of course nevertheless be deleted from the textual message.

Thus, it can be seen from the above description, usability of phone 100 is improved, with the advantageous provision of the emoticon input logic.

ALTERNATE EMBODIMENTS

Figure 8A:
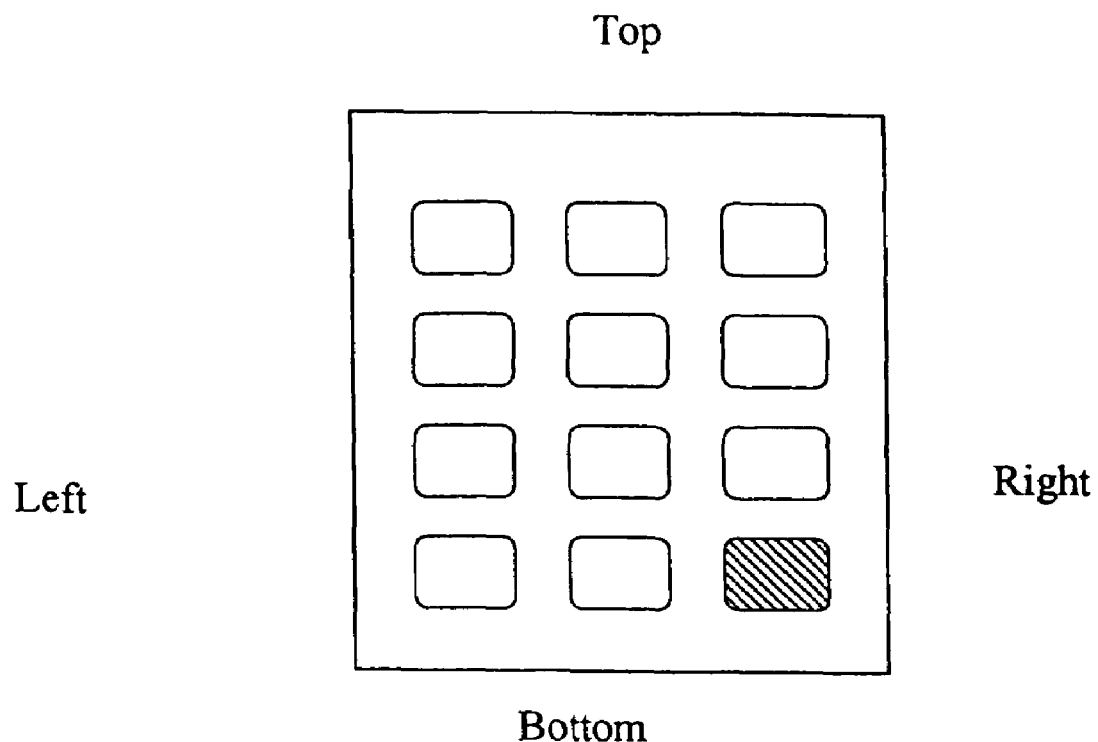
FIGS. 8a–8b illustrate alternate associations of the emoticon input logic to other input keys.
Figure 8B:
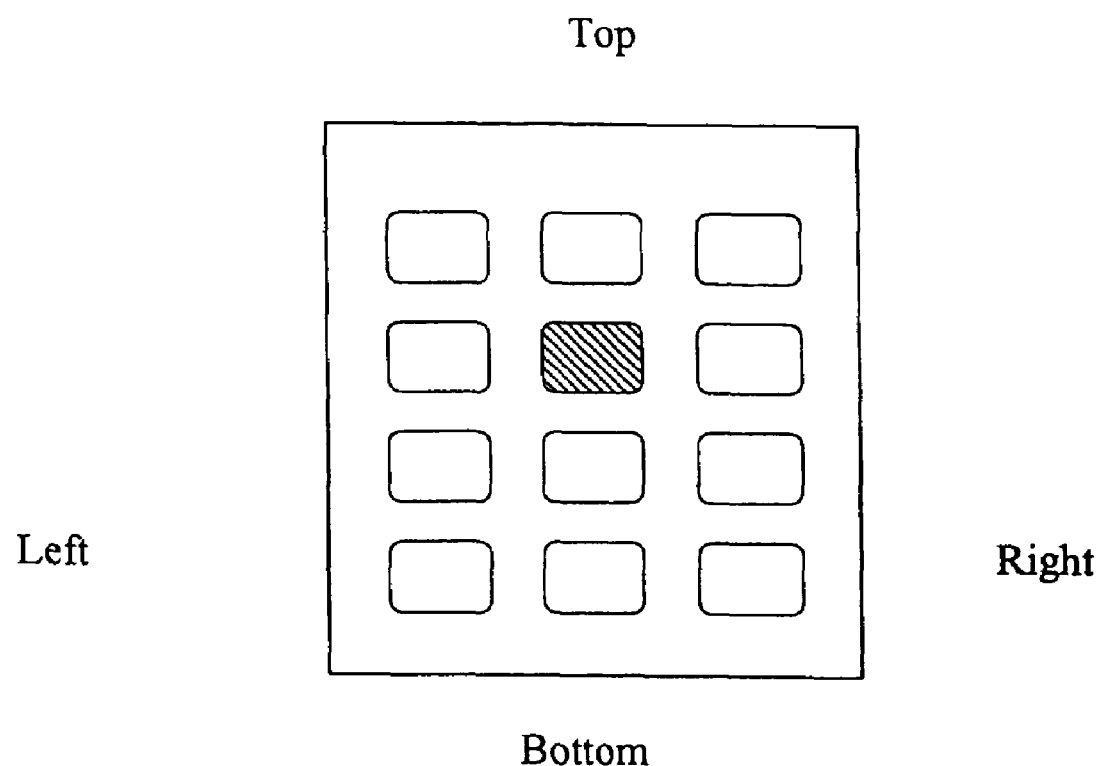

FIGS. 8a–8b illustrate a number of alternate embodiments for associating the emoticon input logic of the present invention with input keys. As illustrated in FIG. 8a, in lieu of being associated with the "lower left corner" input key (which is often the "*" (asterisk) key when phone 100 is operating in voice mode), emoticon input logic may be associated with the "lower right corner" key (which is often the "#" (pound) key when phone 100 is operating in voice mode) instead. Additionally, as illustrated in FIG. 8b, in lieu of being associated with either the "*" or the "#" key, emoticon input logic may be associated with an actual "number" key instead, e.g. the number "5" key as shown, or other number keys, e.g. the "0" key.

Figure 9:
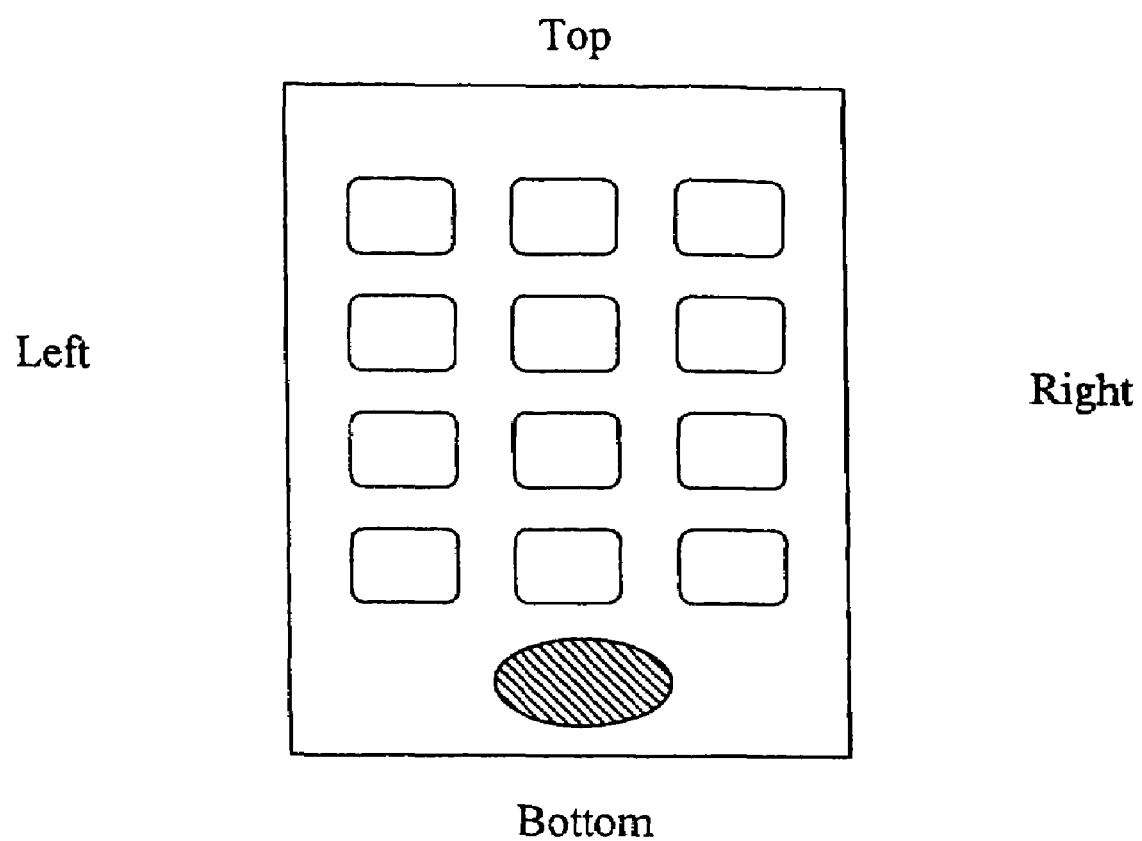
FIG. 9 illustrates yet another alternate association of the emoticon input logic to other input keys, employing an additional key.

FIG. 9 illustrates yet another alternate embodiment for associating emoticon input logic with an input key. As illustrated, in lieu of being associated with one of the keys of the 12-key arrangement 108, emoticon input logic may be associated with a dedicated function key that is in addition to the 12-key arrangement instead. Dedicated function key 110 is provide exclusively for the purpose of facilitating the earlier described emoticon input process.

Figure 10:
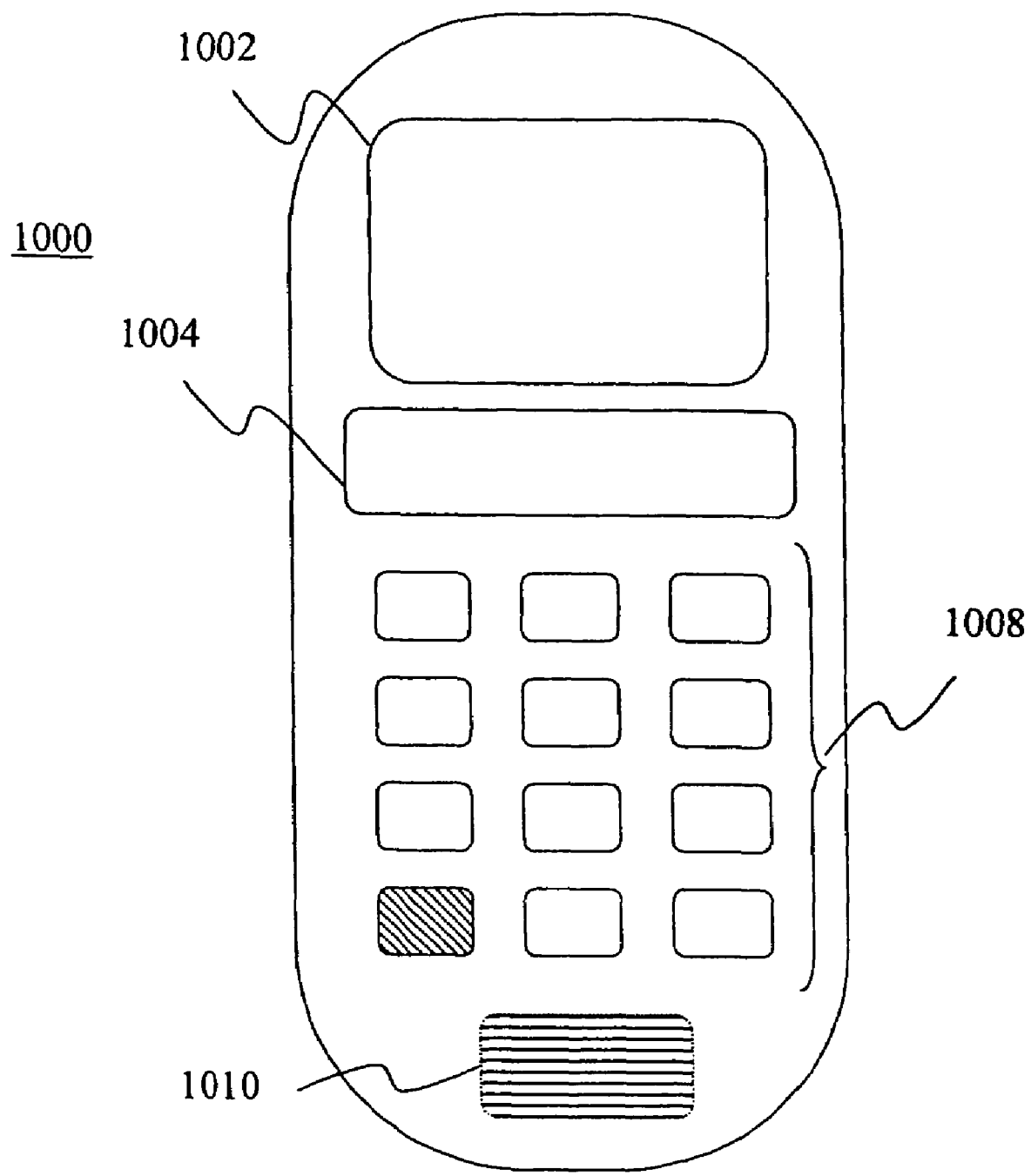
FIG. 10 illustrates yet another alternate association of the emoticon input logic to other input keys, employing a removal cover or skin.

FIG. 10 illustrates yet another alternate embodiment for providing the emoticon input logic of the present invention, and associating the logic with an input key. As illustrated, in lieu of directly providing the emoticon input logic to phone 100, and associating the logic with one of the keys of the 12-key arrangement 108, emoticon input logic and its association with one of the input key 110 is indirectly implemented on a removable cover or skin 1000 having a storage medium 1010, within which the enhanced key driver 506 is disposed. Additionally, storage medium 1010 may also include the input key association information.

As illustrated, cover or skin 1000 also includes a number of cutouts 1002–1004 to facilitate "mating" with wireless phone 100. Naturally, the sizes and shapes, as well as the precise placements of the cutouts are target device dependent. For the embodiment, wireless mobile phone 100 is designed to be able to receive removable cover or skin 1000. Further, wireless mobile phone 100 is designed to be able to access storage medium 1010 for key driver 506 (and key association information if any). Thus, the usability of wireless mobile phone 100 may be "field" enhanced by having removable cover 1000 attached to it in the "field" (i.e. post initial sale).

Note that different collections of emoticons, and/or different input key associations may be provided to different families of removable covers 1000.

Alternatively, in lieu of disposing the implementing program instructions and input key association information in storage medium 1010, some or all of the implementing programming instructions and association information may be replaced by a resource identifier (such as a URL) instead. The replacement resource identifier identifies a location where the replaced implementing programming instructions and input key association information may be retrieved.

Removable or interchangeable cover endowed with the capabilities to personalize or enhance the functionalities of a communication device is the subject matter of provisional application number <to be inserted>, entitled "Personalizing Electronic Devices and Smart Covering", filed on Jul. 17, 2001. The specification of the provisional application is hereby fully incorporated by reference.

Figure 11:
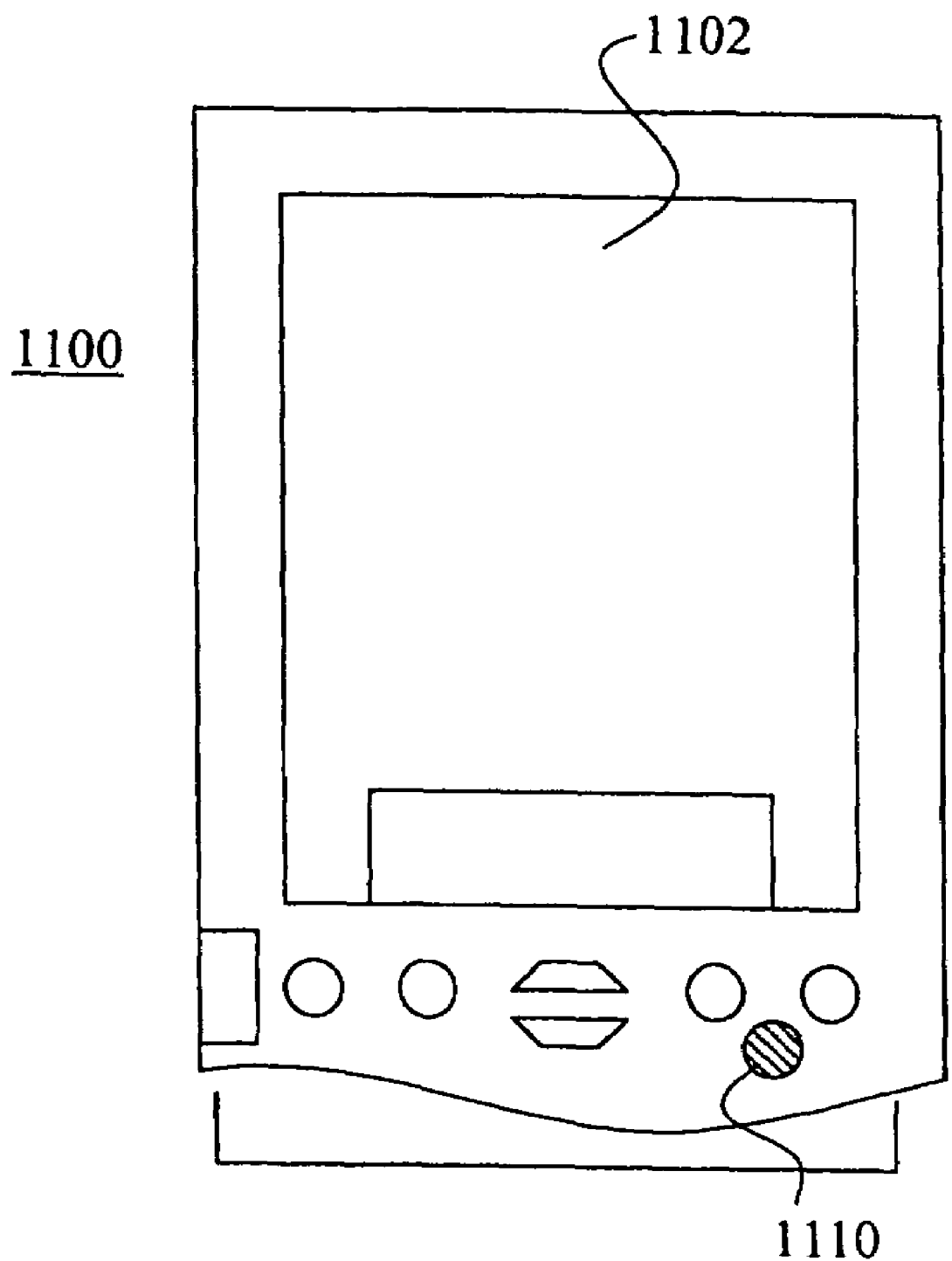
FIG. 11 illustrates another mobile communication device incorporated with the teachings of the present invention, in accordance with another embodiment.

FIG. 11 illustrates another communication device incorporated with the teachings of the present invention. For the illustrated embodiment, communication device 1100 is a palm sized personal digital assistant equipped with email and/or instant messaging capability. Communication device 1100 is also equipped with display 1102, input key 1110 and the complementary key driver logic as earlier described for wireless mobile phone 100. Accordingly, it is readily apparent that the present invention may be practiced on a wide range of communication devices.

CONCLUSION AND EPILOGUE

Thus, a novel emoticon input method and a number of apparatuses embodying the supporting logic for the method have been described. While the present invention has been described in terms of the above illustrated embodiments, those skilled in the art will recognize that the invention is not limited to the embodiments described. For example, in selected embodiments, in lieu of presenting a plurality of emoticons for selection, the emoticons may be presented for selection one at a time, with each "single clicking" reselection of the input key causing another emoticon presented for selection and a "double clicking" reselection of the input key (or selection of another input key or timeout) denoting selection of the displayed emoticon. Further, in others or the same selected embodiments, the list of emoticons available for selection may be user editable. That is, additional facilities (similar to e.g. name entries for an address book application) may be provided for a user to add to or subtract from a list of default emoticons provided by a vendor. Accordingly, the present invention can be practiced with modification and alteration within the spirit and scope of the appended claims. The description is thus to be regarded as illustrative instead of restrictive on the present invention.

The invention claimed is:

1. A mobile communication apparatus comprising:
   a display;
   a first input key; and
   operating logic associated with the first input key to display on said display a list of emoticons for selection by a user, responsive to a selection of said first input key, when the apparatus is operating in a text mode.

2. The apparatus of claim 1, wherein the first input key is an input key for entering an "*" (asterisk) when the apparatus is operating in a voice mode.

3. The apparatus of claim 1, wherein the first input key is an input key for entering a "#", (pound) when the apparatus is operating in a voice mode.

4. The apparatus of claim 1, wherein the first input key is an input key for entering a digit when the apparatus is operating in a voice mode.

5. The apparatus of claim 1, wherein said apparatus further comprises a 12-key input key pad having 12 input keys arranged in a 4×3 array configuration for entry of at least a selected one of alphabet and numeric data, and said first input key being one of said 12 input keys.

6. The apparatus of claim 5, wherein said first input key is the input key occupying a fourth row and first column position of said 4×3 array configuration.

7. The apparatus of claim 6, wherein column positions of said 4×3 array configuration are determined in a selected one of a left-to-right and a right-to-left manner.

8. The apparatus of claim 6, wherein row positions of said 4×3 array configuration are determined in a selected one of a top-to-bottom and a bottom-to-top manner.

9. The apparatus of claim 1, wherein in addition to said first input key, said apparatus further comprises a 12-key input key pad having 12 input keys arranged in a 4×3 array configuration for entry of at least a selected one of alphabet and numeric data.

10. The apparatus of claim 1, wherein said operating logic is designed to display said emoticons for selection in a selected one of a first left-to-right then top-to-bottom display arrangement, a second right-to-left then top-to-bottom display arrangement, a third top-to-bottom then left-to-right display arrangement, and a fourth top-to-bottom then right-to-left display arrangement.

11. The apparatus of claim 1, wherein said operating logic is designed to place a current focus on one of the one or more emoticons displayed for selection.

12. The apparatus of claim 11, wherein said operating logic is further designed to change said placement of current focus to another one of said one or more emoticons displayed for selection responsive to a user input.

13. The apparatus of claim 12, wherein said operating logic is designed to perform said changes in accordance with the order the one or more emoticons are displayed for selection.

14. The apparatus of claim 12, wherein said first input key is also employed to provide said user input.

15. The apparatus of claim 12, wherein said apparatus further comprises at least one other input key, and said at least one other input key is employed to provide said user input.

16. The apparatus of claim 11, wherein said operating logic is further designed to automatically select the emoticon with the current focus upon occurrence of a selected one of elapse of a predetermined amount of time after the first input key was last selected, and selection another input key.

17. The apparatus of claim 11, wherein said operating logic is further designed to select the emoticon with the current focus, responsive to a user input.

18. The apparatus of claim 1, wherein each of said one or more emoticons comprises a plurality of characters.

19. The apparatus of claim 18, wherein said placement of a current focus on a first of displayed emoticons comprises highlighting all characters of the first emoticon.

20. The apparatus of claim 19, wherein said highlighting comprises a selected one of underlying, italicizing and employing bold faces for the characters.

21. The apparatus of claim 18, wherein said selecting of the emoticon with the current focus comprises selecting all characters of the emoticon with the current focus.

22. The apparatus of claim 1, wherein each of said one or more emoticons comprises a pixel map based single graphical symbol.

23. The apparatus of claim 1, wherein said apparatus further comprises:

storage medium having stored therein a plurality of programming instructions designed to implement said operating logic; and a processor coupled to the storage medium to execute the programming instruction.

24. The apparatus of claim 1, wherein said mobile communication device is a wireless mobile phone.

25. The apparatus of claim 1, wherein the apparatus further comprises facilities for adding an emoticon to, or subtracting an emoticon from said one or more emoticons to be displayed for user selection.

* * * * *